UNITED STATES PATENT OFFICE.

JACQUES GRÜNWALD, OF BERLIN, GERMANY.

PROCESS OF MAKING SOAP.

SPECIFICATION forming part of Letters Patent No. 506,004, dated October 3, 1893.

Application filed February 2, 1893. Serial No. 460,759. (No specimens.)

*To all whom it may concern:*

Be it known that I, JACQUES GRÜNWALD, chemist, of Berlin, Alte-Jacobstrasse in the Kingdom of Prussia and German Empire, have invented a new and useful Process of Making Soap, of which the following is a specification.

This invention relates to the manufacture of hard transparent soap, and refers more particularly to the production of an improved base or foundation for such soap.

In the manufacture of soap according to this invention, starch dissolved in a weak solution of chloride of magnesium is treated with potassium or sodium lye, or a mixture of potash, or soda, and hydrate of lime, and to the resultant compound is added glycerine, which imparts to it a supple and fatty nature. The substance thus produced is clarified by the addition of solutions of borax and potash, the whole being well stirred together, and is then ready to be added as a base or foundation to ordinary soap.

In putting the process above described into practice, the mode of operation which I prefer to employ is as follows:—Eight kilograms of chloride of magnesium are dissolved in five kilograms of warm water, and then further diluted with sixty-eight kilograms of water. The solution of magnesium chloride is poured into a paddle mixing tub, and the paddle operating gear set in motion. Forty kilograms of starch are now added to the solution of magnesium chloride, and after being stirred for fifteen minutes the compound has added to it fifty-five kilograms of a solution of potash and hydrate of lime which has been previously raised to a temperature of 20° centigrade.

If the compound formed as above described be now subjected to the action of the paddle mixer for a period of forty-five minutes, a complete saponification will be caused to take place, and by the addition of fifteen kilograms of glycerine the resultant product will have imparted to it a supple and fatty nature. The product is finally clarified by the addition of one kilogram of borax dissolved in six kilograms of warm water, and eight kilograms of potash solution. The whole is then stirred for thirty-five minutes more, and may subsequently be incorporated with from twenty-five to forty per cent. of ordinary soap.

What I claim, and desire to secure by Letters Patent of the United States, is—

The herein described process consisting in dissolving chloride of magnesium in warm water, diluting the same, adding starch to the solution, stirring the same, adding a solution of potash and hydrate of lime and again stirring and finally adding glycerine and clarifying the product, substantially as described.

In witness whereof I have hereunto set my hand in presence of two witnesses.

JACQUES GRÜNWALD.

Witnesses:
PAUL FISCHER,
WILHELM SCHWIETHAL.